(12) United States Patent
Bielby et al.

(10) Patent No.: US 11,836,230 B2
(45) Date of Patent: Dec. 5, 2023

(54) INTELLIGENT MULTI-FACTOR AUTHENTICATION FOR VEHICLE USE

(71) Applicant: Micron Technology, Inc., Boise, ID (US)

(72) Inventors: Robert Richard Noel Bielby, Placerville, CA (US); Michael Tex Burk, Orangevale, CA (US)

(73) Assignee: Micron Technology, Inc., Boise, ID (US)

( * ) Notice: Subject to any disclaimer, the term of this patent is extended or adjusted under 35 U.S.C. 154(b) by 629 days.

(21) Appl. No.: 16/928,775

(22) Filed: Jul. 14, 2020

(65) Prior Publication Data
US 2022/0019646 A1 Jan. 20, 2022

(51) Int. Cl.
*G06F 21/32* (2013.01)
*G06N 3/08* (2023.01)
*B60R 25/30* (2013.01)
*B60R 25/25* (2013.01)
*B60R 25/04* (2013.01)
*G06V 40/16* (2022.01)
*G06V 40/18* (2022.01)
*G06F 18/214* (2023.01)
*G06N 3/045* (2023.01)

(52) U.S. Cl.
CPC .............. *G06F 21/32* (2013.01); *B60R 25/04* (2013.01); *B60R 25/252* (2013.01); *B60R 25/255* (2013.01); *B60R 25/257* (2013.01); *B60R 25/305* (2013.01); *G06F 18/214* (2023.01); *G06N 3/045* (2023.01); *G06N 3/08* (2013.01); *G06V 40/172* (2022.01); *G06V 40/197* (2022.01)

(58) Field of Classification Search
None
See application file for complete search history.

(56) References Cited

U.S. PATENT DOCUMENTS 6,140,939 A * 10/2000 Flick .................. G07C 9/00563
340/12.55
9,679,210 B2 6/2017 Sutton et al.
(Continued)

OTHER PUBLICATIONS

International Search Report & Written Opinion, PCT/US2021/040944, dated Oct. 25, 2021.

*Primary Examiner* — Kaveh Abrishamkar
(74) *Attorney, Agent, or Firm* — Greenberg Traurig

(57) ABSTRACT

A vehicle or a mobile device within or near the vehicle can have multiple sensors to authenticate a passenger or driver of the vehicle in different ways, e.g., fingerprint, facial recognition, voice fingerprinting, iris scan, etc. Also, non-biometric factors can be used to authenticate the passenger or driver of the vehicle, e.g., MAC address, RFID, username and password, PIN, etc. In addition, a network attached security asset accessed by a vehicle can be included within the vehicle such as modem within the vehicle with authentication capabilities. Also, the authentication can be according to a zero trust framework or networking methodology. Some or all of such credentials and authentication factors or methods can fail individually, at least in part, in various conditions. An intelligent system, making use of intelligent multi-factor authentication, can combine such information to determine the identity of the passenger or driver with more reliability.

18 Claims, 5 Drawing Sheets

(56) References Cited

U.S. PATENT DOCUMENTS

| | | | |
|---|---|---|---|
| 10,053,056 B1* | 8/2018 | Zhang | B60R 25/25 |
| 10,769,258 B2 | 9/2020 | Shin et al. | |
| 10,850,709 B1* | 12/2020 | Nagata | G07C 9/00563 |
| 11,548,473 B1* | 1/2023 | Ramesh | B60R 25/04 |
| 2007/0150747 A1 | 6/2007 | Mani et al. | |
| 2017/0035332 A1* | 2/2017 | Wahnschafft | A45C 11/00 |
| 2019/0143936 A1* | 5/2019 | Abel Rayan | B60R 25/10 |
| | | | 701/2 |
| 2020/0026939 A1* | 1/2020 | Sim | G06V 40/172 |
| 2021/0309182 A1* | 10/2021 | Ragunathan | G06V 40/166 |

* cited by examiner ers together to make the vehicle function or have more personalization features. Ultimately, the solution includes an intelligent multi-factor authentication for a driver or passenger of a vehicle.

INTELLIGENT MULTI-FACTOR AUTHENTICATION FOR VEHICLE USE

FIELD OF THE TECHNOLOGY

At least some embodiments disclosed herein relate to intelligent multi-factor authentication for vehicle use. Also, some embodiments disclosed herein relate to intelligent redundant authentication of a driver or passenger for vehicle use.

BACKGROUND

Cybersecurity for threats associated with vehicles has become increasingly important with the high number of electronic control units in vehicles and the great amount of data communication between vehicles and computing systems. Threats to vehicles can be aimed at the safety of people in and around a vehicle, by modifying the cyber-physical system of the vehicle (e.g., attacks can attempt to modify electronic-based steering, braking, and accelerating). Also, threats to vehicles can be aimed at invading privacy of vehicle users. For example, attacks can try to obtain GPS data on the vehicle, user input for vehicle systems, and conversations in the vehicle.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
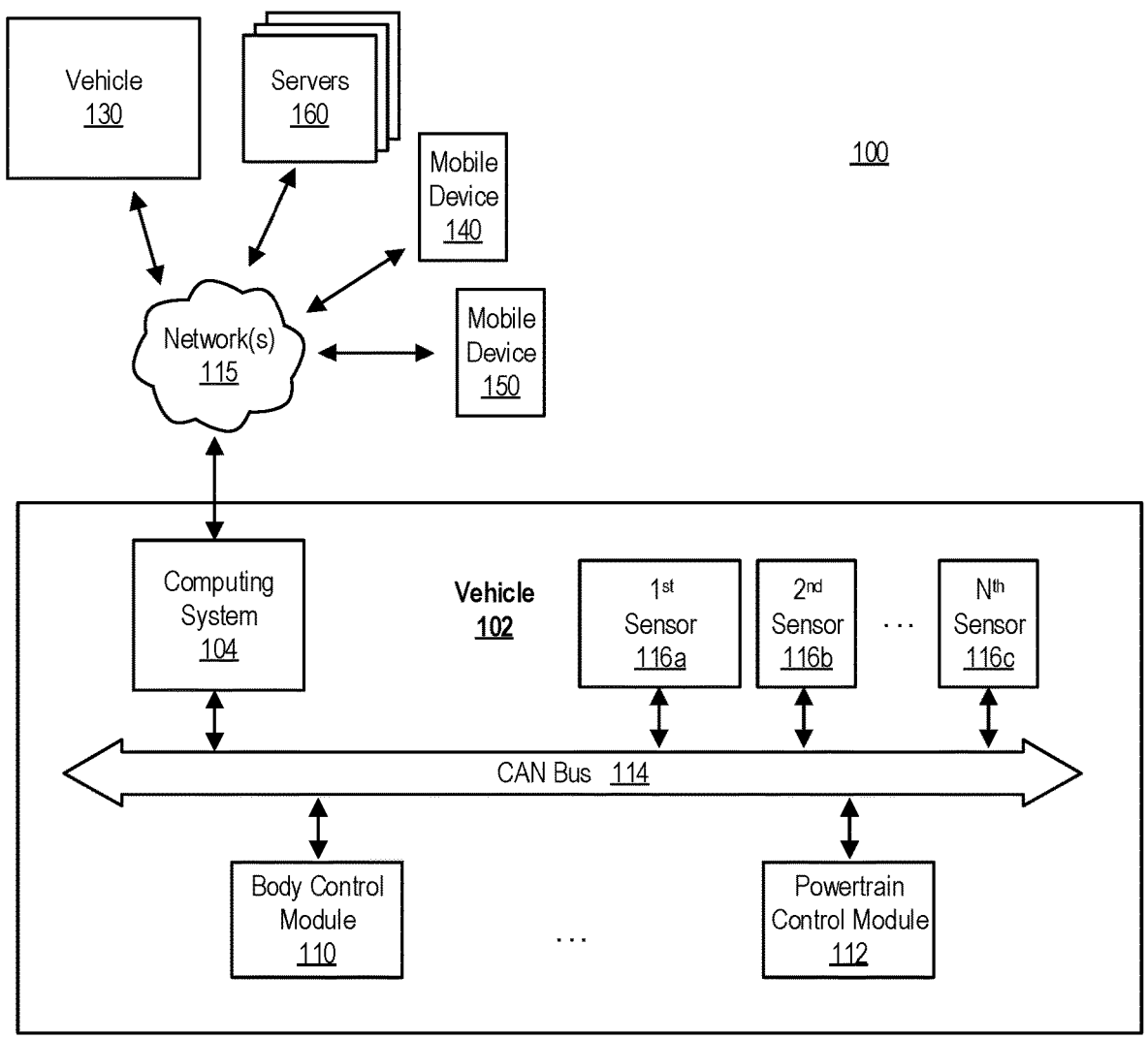
FIGS. 1 to 3 illustrate an example networked system that includes at least mobile devices and vehicles and that is configured to implement intelligent multi-factor authentication for vehicle use, in accordance with some embodiments of the present disclosure.

At least some embodiments disclosed herein relate to intelligent multi-factor authentication for vehicle use. Also, some embodiments disclosed herein relate to intelligent redundant authentication of a driver or passenger for vehicle use.

Many different cybersecurity countermeasures for vehicles have been proposed and applied. Some example security measures include sub-networks that can limit attacker capabilities even when an attacker gains access to a vehicle system or an electronic control unit (ECU). Sub-networks separate vehicle systems and ECUs so that if an attacker accesses one system or ECU, other systems or ECUs are not necessarily accessed. Gateways, such as firewalls, and intrusion detection systems (IDS) can be used to enhance the separation and security of vehicle systems and ECUs.

Also, authentication protocols can be used as a cybersecurity countermeasure. For example, authentication has been implemented for control area network (CAN) busses of vehicles via authentication protocols. Furthermore, hardware security modules can be used in a vehicle with or without authentication protocols. Such modules can execute encryption or decryption routines and authentication protocols in a vehicle.

Vehicles can include cars, trucks, boats, and airplanes, as well as vehicles or vehicular equipment for military, construction, farming, or recreational use. Vehicles can be customized or personalized via vehicle electronics. Vehicle electronics can include electronic systems used in vehicles. Vehicle electronics can include electronics for the drivetrain of a vehicle, the body or interior features of the vehicle, entertainment systems in the vehicle, and other parts of the vehicle. Ignition, engine, and transmission electronics can be found in vehicles with internal combustion powered machinery. Related elements for control of electrical vehicular systems are also found in hybrid and electric vehicles such as hybrid or electric automobiles. For example, electric cars can rely on power electronics for main propulsion motor control and managing the battery system.

Vehicle electronics can be distributed systems and can include a powertrain control module and powertrain electronics, a body control module and body electronics, interior electronics, and chassis electronics, safety and entertainment electronics, and electronics for passenger and driver comfort systems. Also, vehicle electronics can include electronics for vehicular automation. Such electronics can include or operate with mechatronics, artificial intelligence, and distributed systems. A vehicle using automation for complex tasks, including navigation, may be referred to as semi-autonomous. A vehicle relying solely on automation can be referred to as autonomous. Society of Automotive Engineers (SAE) has categorized autonomy in to six levels. Level 0 or no automation. Level 1 or driver assistance, wherein the vehicle can control either steering or speed autonomously in specific circumstances to assist the driver. Level 2 or partial automation, wherein the vehicle can control both steering and speed autonomously in specific circumstances to assist the driver. Level 3 or conditional automation, wherein the vehicle can control both steering and speed autonomously under normal environmental conditions, but requires driver oversight. Level 4 or high automation, wherein the vehicle can complete a travel autonomously under normal environmental conditions, not requiring driver oversight. And, level 5 or full autonomy, wherein the vehicle can complete a travel autonomously in any environmental conditions.

To address these and other technical problems, a vehicle or a mobile device within or near the vehicle can have multiple sensors to authenticate a user and/or a driver of the vehicle in different ways, e.g., fingerprint, facial recognition, voice fingerprinting, iris scan, etc. Also, non-biometric factors can be used to authenticate a user and/or a driver of the vehicle, e.g., MAC address, RFID, username and password, PIN, etc. Or, a network attached security asset accessed by a vehicle can be included within the vehicle such as modem within the vehicle with authentication capabilities. Also, the authentication can be according to a zero trust framework or networking methodology. Some or all of such credentials and authentication factors can fail individually, at least in part, in various conditions. An intelligent system, making use of intelligent multi-factor authentication, can combine such information to determine the identity of a user and/or driver with more reliability.

In some embodiments, an intelligent multi-factor authentication system can use computer logic and Boolean expressions. However, in some embodiments, an intelligent multi-factor authentication system does merely use simple computer logic and Booleans (e.g., such as if fingerprint and speaker recognitions partially fail, then use facial recognition too). In more complex embodiments, the intelligent multi-factor authentication system can use partial successes of parts of multi-factor authentication and piece such successes together to confirm the identity of a user and/or driver of the vehicle. For example, a partial finger print and a partial facial image of the user can still be recognizable via a more sophisticated system, such as a system that employs machine learning to piece together partially successful authentication factors to confirm the identity of a user and/or driver.

To increase security of keyless entry and/or activation of a vehicle, multi-factor and/or redundant authentication can be utilized by the vehicle. The multi-factor and/or redundant authentication for use of the vehicle's can also be beneficial in that one or more of the factors of identification may at least partially fail in certain circumstances or at least may not be as reliable in certain circumstances.

The intelligent multi-factor authentication system can combine the information retrieved from the multi-factor and/or redundant authentication to determine the identity of a driver or simply a passenger of a vehicle. For example, upon successful authentication of a valid driver, the vehicle can become accessible for driving by the valid driver. Machine learning and artificial intelligence can be used to determine the identity of a driver or passenger of the vehicle based on combined multi-factor authentication information. Also, a specific order or priority of biometric and non-biometric identifiers can be used.

Biometric identifiers can include, for example, fingerprint, facial recognition, speaker recognition (e.g., in-car speech recognition), iris scan, etc. Non-biometric identifiers or device based identifiers, including identifiers retrieved from a computing device, can include usernames, passwords, PINs, tokens, device identifiers and credentials, etc. The non-biometric identifiers can be retrieved from a user's wearable or mobile device upon approaching or entry into the vehicle. Biometric identifiers can be sensed from a user upon approaching or entry into the vehicle too. Also, the identifiers can be sensed by the vehicle at an entry point of the vehicle and/or when a person is in a seat or a certain position in the vehicle. Some example embodiments can include a fingerprint sensor (e.g., fingerprint sensor located on a door handle), facial recognition by a camera (e.g., a camera facing inside or outside of the vehicle), speaker recognition (e.g., speaker recognition using a microphone inside and/or outside the vehicle), and/or an iris scan (e.g., an iris scan at an entry point of the vehicle such as at the door of the vehicle).

Some embodiments can include a vehicle or a system within a vehicle. For example, some embodiments can include a vehicle with at least a body and a powertrain. And, such embodiments and others include a system for intelligent multi-factor authentication for vehicle use. Such a system can include a plurality of sensors that are part of the vehicle and/or part of a mobile device. Such sensors can sense biometric features of a potential passenger and/or a potential driver of the vehicle. The sensors can also derive corresponding biometric data based on the sensed biometric features. The biometric data can be used as authentication factors. Also, non-biometric data can be used as authentication factors (e.g., usernames, passwords, PINs, tokens, mobile device identifiers and credentials, etc.).

In some embodiments, the system can include first and second sensors (or more) attached to the body of the vehicle; and, the system can include a controller (such as a controller including computer hardware and/or software and/or circuitry including a computing system and/or an ECU). The controller can be configured to receive first biometric data from the first sensor and second biometric data from the second sensor (also, additional biometric data can be received from other sensors of the vehicle or of a mobile device of the user being authenticated, and non-biometric data for authentication can also be received from the mobile device or a computing device that is in the vehicle). The non-biometric data can be from a user profile such as a user profile stored on a mobile device.

The controller can also be configured to associate the received data with the user to be authenticated (such as the received data from the first and second sensors). The controller can also be configured to confirm an identity of the user according to at least the received data (such as the received data from the first and second sensors). For example, to confirm the identity of the user, the controller can be configured to: generate a first confidence score based on a comparison of a known first biometric feature of the user and a biometric feature in the first biometric data received from the first sensor, generate a second confidence score based on a comparison of a known second biometric feature of the user and a biometric feature in the second biometric data received from the second sensor, and then generate a combined confidence score based on at least the generated first and second confidence scores. And, then, the controller can be configured to confirm an identity of the user when the generated combined confidence score exceeds a confidence threshold.

Upon confirmation of the identity of the user, the controller can be configured to unlock a door of the vehicle, activate at least part of the powertrain, or perform some other action for the vehicle, or any combination thereof. For example, in some embodiments, upon confirmation of the identity of the user, the controller can be configured to give the authenticated driver and/or passenger control of one or more systems of the vehicle via one or more controls of the vehicle and/or via a mobile device of the driver and/or passenger. In other words, upon confirmation of the identity of the user, the controller can be configured to give a driver or a passenger of the vehicle control of some aspects of the vehicle via a mobile device or one or more controls of the vehicle. Also, for example, the some other action can include providing connected functionality such as network connected applications and e-commerce.

In some embodiments, the passenger can be given control of passenger and/or driver comfort aspects (e.g., seat position and/or seat shape adjustments, air temperature and other air conditions, seat temperature), non-driving features (e.g., heating and conditioning of windows, mirrors, and wipers, window positioning, as well as door, glove compartment, and trunk locking and unlocking, and lighting), entertainment or infotainment systems, navigation systems, telephone systems, and other electronic integrated cockpit systems that do not control driving of the vehicle. Also, a confirmed and authenticated driver or passenger of the vehicle can be given control of driving aspects of the vehicle. The driving aspects can include driving configurations and preferences adjustable from a controller via automotive electronics (such as adjustments in the transmission, engine, chassis, passenger environment, and safety features via respective automotive electronics). The driving aspects can also include typical driving aspects and/or drive-by-wire aspects, such as giving control to steering, braking, and acceleration of the vehicle.

A confirmed passenger and/or driver can also be given control to automated driving configurations and preferences. A passenger and/or driver can be given control to set various levels of automation according to the SAE, such as control to set no automation preferences/configurations (level 0), driver assistance preferences/configurations (level 1), partial automation preferences/configurations (level 2), conditional automation preferences/configurations (level 3), high automation preferences/configurations (level 4), or full preferences/configurations (level 5). The passenger and/or driver can also be given control to set driving mode such as sports or performance mode, fuel economy mode, tow mode, all-electric mode, hybrid mode, AWD mode, FWD mode, RWD mode, and 4WD mode.

The confirmation of the identity of the passenger and/or driver can be via the intelligent multi-factor authentication system. The intelligent multi-factor authentication system can use artificial intelligence and machine learning to enhance the intelligent multi-factor authentication system. There can be patterns in the authentication factors that are learned over time that are usually normal, and other patterns that can be learned to be abnormal and suspicious, within the protocol. And, machine learning and/or AI can be used at least partially for the evaluations of legitimacy of the confirmation of the identity of the passenger and/or the driver. Also, the intelligent multi-factor authentication system can include cryptography mechanisms (e.g., asymmetric cryptography) in addition to its multi-factor authentication mechanisms. Additionally, the authentication factors can be knowledge factors (e.g., pins and passwords), possession factors (e.g., tokens), inherent factors (e.g., fingerprints, voice, and behavioral dynamics), and location factors (e.g., proximity to entrance of vehicle, driver seat, or passenger seat).

Figure 2:
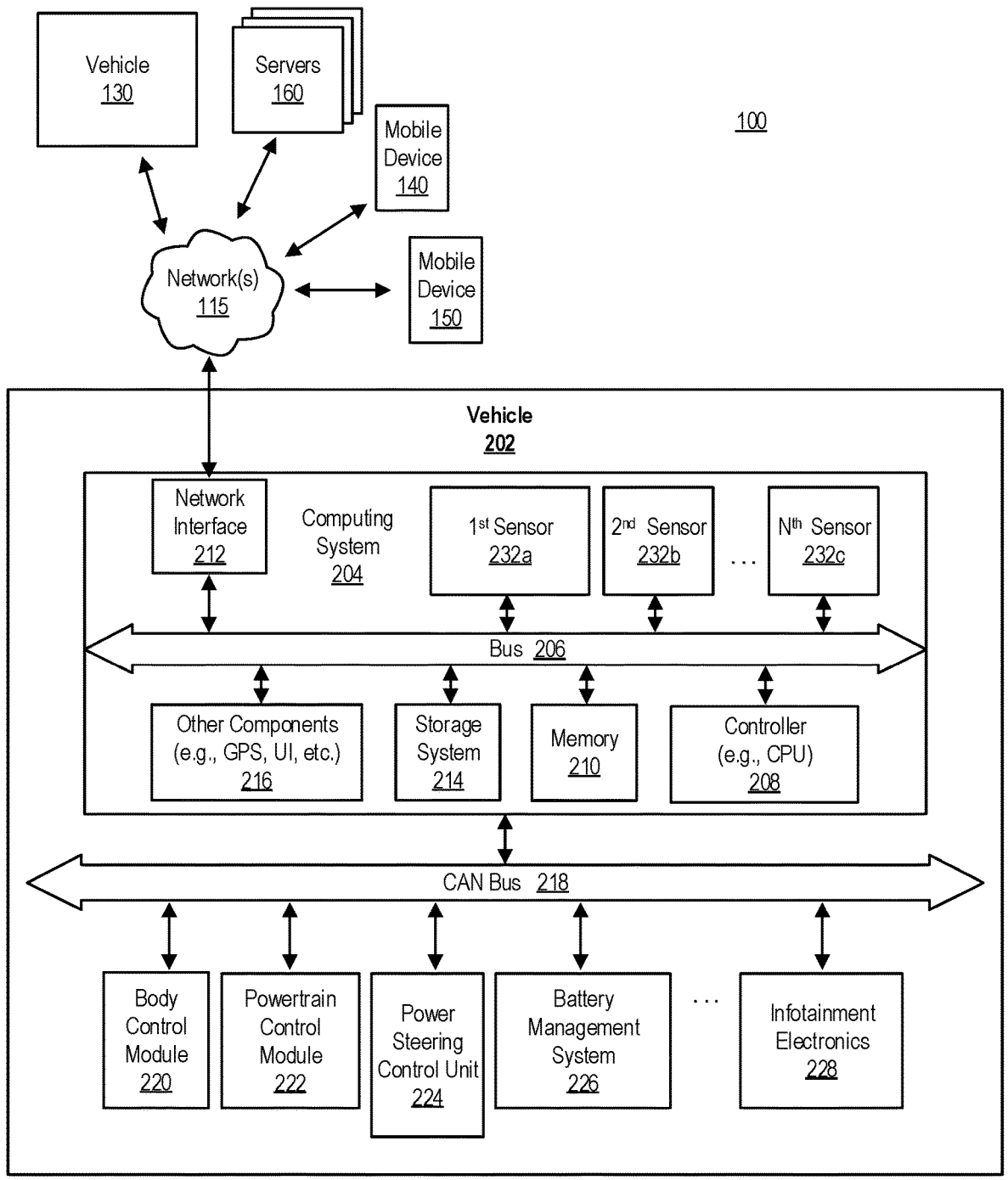
Figure 3:
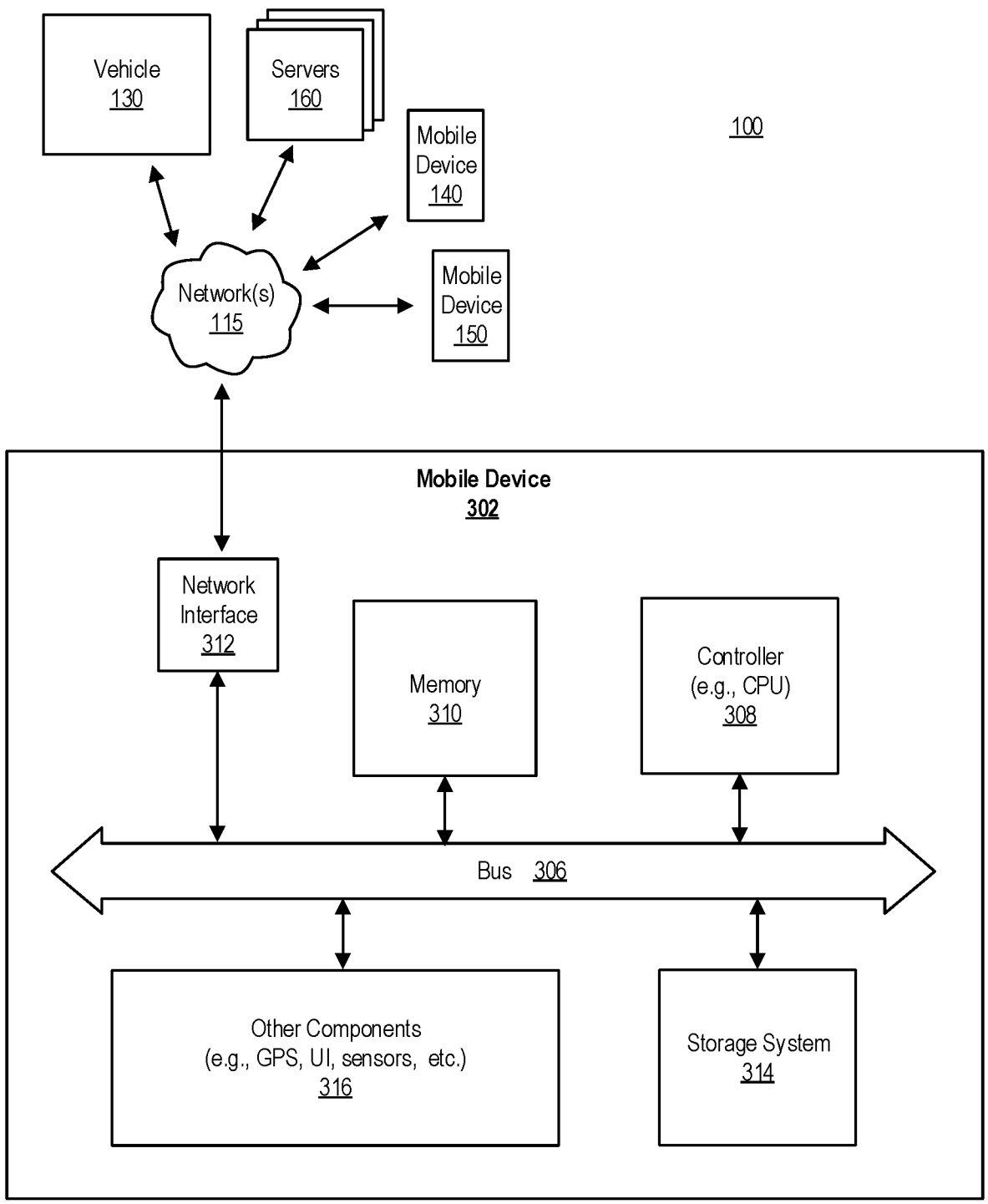

FIGS. 1 to 3 illustrate an example networked system 100 that includes at least mobile devices and vehicles (e.g., see mobile devices 140, 150, and 302 and vehicles 102, 202, and 130 as well as servers 160) and that is configured to implement intelligent multi-factor authentication for vehicle use, in accordance with some embodiments of the present disclosure.

The networked system 100 is networked via one or more communications networks 115. Communication networks described herein, such as communications network(s) 115, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system 100 (e.g., see mobile devices 140, 150, and 302 and vehicles 102, 202, and 130 as well as servers 160) can each be a part of a peer-to-peer network, a client-server network, a cloud computing environment, or the like. Also, any of the apparatuses, computing devices, vehicles, sensors or cameras, and/or user interfaces described herein can include a computer system of some sort (e.g., see vehicle computing systems 104 and 204). And, such a computer system can include a network interface to other devices in a LAN, an intranet, an extranet, and/or the Internet. The computer system can also operate in the capacity of a server or a client machine in client-server network environment, as a peer machine in a peer-to-peer (or distributed) network environment, or as a server or a client machine in a cloud computing infrastructure or environment.

As shown in FIG. 1, the networked system 100 can include at least a vehicle 102 that includes a vehicle computing system 104, a body and controllable parts of the body (not depicted), a powertrain and controllable parts of the powertrain (not depicted), a body control module 110, a powertrain control module 112, a plurality of sensors (e.g., see sensors 116a, 116b, and 116c), and a bus 114 that connects at least the vehicle computing system, the body control module, the powertrain control module, and the plurality of sensors to each other. Also, as shown, the vehicle 102 is connected to the network(s) 115 via the vehicle computing system 104. Also, shown, vehicle 130 and mobile devices 140 and 150 as well as servers 160 are connected to the network(s) 115. And, thus, are communicatively coupled to the vehicle 102. The bus 114 can include a controller area network bus (CAN bus), or a media oriented systems transport bus (MOST bus), or other forms of communications infrastructure in a vehicle that allow devices such as microcontrollers to communicate with each other in the vehicle, such as Ethernet. In some embodiments, the bus 114 can include gateways where in vehicle device interaction is abstracted with application programming interfaces (APIs) such as for security and safety.

The vehicle 102 includes vehicle electronics, including at least electronics for the controllable parts of the body and the controllable parts of the powertrain. The vehicle 102 includes the controllable parts of the body and such parts and subsystems being connected to the body control module 110. The body includes at least a frame to support the powertrain. A chassis of the vehicle can be attached to the frame of the vehicle. The body can also include an interior for at least one driver or passenger. The interior can include seats. The controllable parts of the body can also include one or more power doors and/or one or more power windows. The body can also include any other known parts of a vehicle body. And, the controllable parts of the body can also include a convertible top, sunroof, power seats, and/or any other type of controllable part of a body of a vehicle. The body control module 110 can control the controllable parts of the body.

Also, the vehicle 102 also includes the controllable parts of the powertrain. The controllable parts of the powertrain and its parts and subsystems are connected to the powertrain control module 112. The controllable parts of the powertrain can include at least an engine, transmission, drive shafts, suspension and steering systems, and powertrain electrical systems. The powertrain can also include any other known parts of a vehicle powertrain and the controllable parts of the powertrain can include any other known controllable parts of a powertrain.

The plurality of sensors (e.g., see sensors 116a, 116b, and 116c) of the vehicle 102 can include any type of sensor or camera configured to sense and/or record one or more biometric features or characteristics. A sensor of the vehicle 102 can also be configured to generate data corresponding to the one or more biometric features or characteristics according to the sensed and/or recorded biometric feature(s) or characteristic(s). A sensor of the vehicle 102 can also be configured to output the generated data corresponding to the one or more biometric features or characteristics. Any one of the plurality of sensors can also be configured to send, such as via the bus 114, the generated data corresponding to the one or more biometric features or characteristics to the computing system 104 or electronic circuitry of the vehicle 102 (such as the body control module 110 and the powertrain control module 112).

At least one or more of the sensors of the vehicle 102 can include, be, or be a part of a biometric device configured to verify and/or recognize an identity of a person based on one or more physiological or behavioral characteristics. Such characteristics can include fingerprints, facial images, iris recognition, and voice recognition, just to name a few. The biometric device can include, be, or be a part of a chemical biometric device, a visual biometric device, a temperature-based biometric device, a behavioral biometric device, an olfactory biometric device, or an auditory biometric device, or any combination thereof. Also, the mobile devices and other vehicles described herein, can include such sensors and/or biometric devices. And, for example, such sensors and/or biometric devices can be attached to a body of a vehicle.

In some embodiments, authentication of a passenger or driver of a vehicle may not include using biometric data. And, in other embodiments, authentication of a passenger or driver of a vehicle can include a combined use of non-biometric data and biometric data. And, in some other embodiments, authentication of a passenger or driver of a vehicle may only include use of biometric data. Non-biometric data or elements can be in the form of PINs (e.g., touch input, combinations of PINs, etc.), keys, wireless remote keys, RFID via a chip, MAC address (e.g., MAC address of a mobile computing device), etc. Non-biometric data or elements can also be in the form of usernames, passwords, tokens, other types of mobile device identifiers and credentials, etc. The non-biometric data can be from a user profile such as a user profile stored on a mobile device.

The authentication of a passenger or driver of a vehicle can include intelligent multi-factor authentication. Intelligent multi-factor authentication can be beneficial because an authentication not having such a feature may fail to recognize and confirm the passenger or driver by any one of known authentication methods (e.g., facial recognition, fingerprint, voice recognition, PIN, username and password, etc.). But, a combination of authentication methods may be sufficient to recognize and confirm the passenger or driver to a certain level of confidence. Some of the systems may not be allowed to authenticate the passenger or driver alone. For example, some embodiments, may rely on the presence of a known mobile device or another known user as well. Multi-factor authentication that uses combined data of multiple authentication methods can be considered intelligent multi-factor authentication. And, such combined data can be used to confirm the identity of a passenger or driver when the outputs of the multi-factor authentication combined (the combined data) shows a likelihood of the passenger or driver being a valid user or driver (such as an owner of the vehicle) above a threshold to allow access to the vehicle.

Information from different authentication systems can have different weights; and, information from different systems can allow for different degrees of deficiencies in the combined authentication data. Also, in some embodiments, implementation of the multi-factor authentication can include a decision tree or weighted formula.

Also, in some embodiments, machine learning and artificial intelligence can be used in one of the combined authentication methods or processing at later data processing stages of the intelligent multi-factor authentication. The artificial intelligence can include use of an ANN. And, use of the ANN or another form of AI can include training the ANN or other form of AI to recognize a valid user or driver more effectively and/or efficiently over time and further use of the vehicle. Also, since different vehicles have different usages, such systems can be trained differently to have different requirements.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs are not known before the completion of training. The ANN can be trained to classify an item into a plurality of categories, or data points into clusters. Multiple training algorithms can be employed for a sophisticated machine learning/training paradigm.

In one example, an artificial neural network may be configured as an ANN or as a convolutional neural network (CNN) that is trained using reinforcement learning. For example, the ANN may gather biometric data (e.g., fingerprints, facial images, iris recognition, and voice recognition, etc.) and non-biometric data (e.g., PINs, keys, wireless remote keys, RFID via a chip, usernames, passwords, tokens, other types of mobile device identifiers and credentials, etc.) when a person approaches or enters the vehicle and stores the data in a database during a training period. Each time the person enters the driver's seat during the training period, the person is identified in the database as a valid driver and the data for that person is reinforced in the ANN. Each time the person enters a passenger seat during the training period, the person is identified in the database as a valid passenger and the data for that person is reinforced in the ANN. During the training period the machine-learning model will take in new data from sensors and other input devices on the vehicle for valid users (e.g., changes in appearance (clothing, glasses, facial hair, etc.), different lighting conditions, different angles, different non-biometric authentication methods, etc.) and will learn and reinforce recognition of valid users.

The computing system 104 includes electronic circuitry and can include an ECU, and can be configured to receive biometric data from the one or more of the plurality of sensors of the vehicle 102. Also, the computing system 104 can be configured to receive non-biometric data from non-biometric data sources such as a mobile device (e.g., see mobile devices 140 and 150) or a computing device of the vehicle 102. Also, the computing system 104 can be configured to receive biometric data from other biometric data sources other than the sensors of the vehicle 102 such as from sensors of a mobile device. Also, other non-biometric data sources can include databases of services, eCommerce, third party developers, and/or trusted or untrusted applications. E.g., see servers 160, which can include such databases.

The authentication data received from such sources by the computing system 104 can be associated with a passenger or a driver. For example, the computing system 104 can be configured to associate the received data with a passenger or a driver. Also, the computing system 104 can be configured to determine and confirm or authenticate an identity of the user according to at least the received data. The computing system 104 can be configured to generate a first confidence score based on a comparison of a known first biometric or non-biometric feature of a user and a biometric or non-biometric feature in the received data received from an authentication data source, as well as generate a second confidence score (or more confidence scores) based on a comparison (or comparisons) of a known second biometric or non-biometric feature (or known additional biometric or non-biometric features) of the user and one or more biometric or non-biometric features in the received data received from another authentication data source. Also, the computing system 104 can be configured to generate a combined confidence score based on at least the generated first and second confidence scores (or at least the first and additional confidence scores), and confirm an identity of the user when the generated combined confidence score exceeds a confidence threshold. And, computing system 104 can be configured to perform one or more actions of the vehicle 102 or control one or more actions of the vehicle (such as unlock a door of the vehicle, or activate at least part of the powertrain of the vehicle, or any combination thereof), upon confirmation of the identity of the user.

In some embodiments, for example, a vehicle (such as the vehicle 102), can include a body and a powertrain as well as first and second sensors attached to the body (e.g., see sensors 116a and 116b). Also, the vehicle can include a controller (e.g., see computing system 104), configured to receive first biometric data from the first sensor as well as receive second biometric data from the second sensor. The controller can also be configured to associate the data from the first and second sensors with a user as well as confirm an identity of the user according to at least the data from the first and second sensors. In some examples, the controller can also be configured to generate a first confidence score based on a comparison of a known first biometric feature of the user and a biometric feature in the first biometric data received from the first sensor, as well as generate a second confidence score based on a comparison of a known second biometric feature of the user and a biometric feature in the second biometric data received from the second sensor. The controller can also be configured to generate a combined confidence score based on at least the generated first and second confidence scores and confirm an identity of the user when the generated combined confidence score exceeds a confidence threshold. And, the controller can also be configured to unlock a door of the vehicle, or activate at least part of the powertrain, or any combination thereof, upon confirmation of the identity of the user.

In such embodiments and others, the controller can be configured to generate at least one of the confidence scores using at least one ANN. The input of the at least one ANN can include at least the received biometric data or a derivative thereof. Also, the controller can be configured to train the at least one ANN over time to increase effectiveness and/or efficiency of the at least one ANN for the user. The controller can also be configured to generate the second confidence score using a second ANN, wherein input of the second ANN can include the received second biometric data or a derivative thereof. And, the controller can also be configured to train the second ANN over time to increase effectiveness and/or efficiency of the second ANN for the user over time.

In such embodiments and others, the controller can be configured to generate the combined confidence score using a third ANN. The input of the third ANN can include at least one of the first received biometric data or a derivative thereof, the second received biometric data or a derivative thereof, output of the ANN or a derivative thereof, or output of the second ANN or a derivative thereof, or any combination thereof. And, the controller can be configured to train the third ANN over time to increase effectiveness and/or efficiency of the third ANN for the user over time.

In such embodiments and others, the sensors can include or be a part of a fingerprint scanner, a microphone, a camera, a thermal camera, etc. For example, the first sensor can include a fingerprint scanner and can be a part of a fingerprint identification system. In such an example and other examples, the second sensor can include a microphone and is a part of a speaker recognition system. Or, the second sensor can include a camera and can be a part of a facial recognition system or an iris recognition system. The camera can be a thermal camera in some embodiments, such as embodiments using a facial recognition system.

In some embodiments, for example, a vehicle (such as the vehicle 102), can include a body and a powertrain as well as a sensor attached to the body (e.g., see sensor 116a). Also, the vehicle can include controller (e.g., see computing system 104), configured to receive biometric data from the sensor as well as receive non-biometric data from a mobile device, when the mobile device is within a predetermined threshold distance from the sensor of the vehicle. As mentioned, in some embodiments, the authentication data can include non-biometric data.

The controller, in such embodiments and others, can be configured to associate the biometric data from the sensor and the non-biometric data from the mobile device with a user, as well as confirm an identity of the user according to at least the biometric data and the non-biometric data. For example, the controller, in such embodiments and others, can be configured to generate a first confidence score based on a comparison of a known biometric feature of the user and a biometric feature in the biometric data received from the sensor, and generate a second confidence score based on a comparison of a known non-biometric credential of the user and a non-biometric element in the non-biometric data received from the mobile device. Also, the controller can be configured to generate a combined confidence score based on at least the generated first and second confidence scores, and confirm an identity of the user when the generated combined confidence score exceeds a confidence threshold. And, the controller can be configured to unlock a door of the vehicle, activate at least part of the powertrain, or perform some other action for the vehicle, or any combination thereof, upon confirmation of the identity of the user. Also, for example, the some other action can include providing connected functionality such as network connected applications and e-commerce.

In such embodiments and others, the controller can be configured to generate at least one of the confidence scores using at least one artificial neural network (ANN), wherein input of the at least one ANN includes at least the received biometric data or a derivative thereof. And, the controller can be configured to train the at least one ANN over time to increase effectiveness and/or efficiency of the at least one ANN for the user.

In such embodiments and others, the controller can be configured to generate the first confidence score using an ANN, wherein input of the ANN includes the received first biometric data or a derivative thereof. And, the controller can be configured to train the ANN over time to increase effectiveness and/or efficiency of the ANN for the user over time. Also, the controller can be configured to generate the second confidence score using a second ANN, wherein input of the second ANN includes the received second biometric data or a derivative thereof. And, the controller can be configured to train the second ANN over time to increase effectiveness of the second ANN for the user over time. Also, the controller can be configured to generate the combined confidence score using a third ANN, wherein input of the third ANN includes at least one of the first received biometric data or a derivative thereof, the second received biometric data or a derivative thereof, output of the ANN or a derivative thereof, or output of the second ANN or a derivative thereof, or any combination thereof. And, the controller can be configured to train the third ANN over time to increase effectiveness of the third ANN for the user over time.

In such embodiments and others, the sensor can include or be a part of a fingerprint scanner, a microphone, a camera, a thermal camera, etc. For example, the sensor can include a fingerprint scanner and can be a part of a fingerprint identification system. Or, the sensor can include a microphone and is a part of a speaker recognition system. Or, the sensor can include a camera and can be a part of a facial recognition system or an iris recognition system. The camera can be a thermal camera in some embodiments, such as embodiments using a facial recognition system.

In some embodiments, the electronic circuitry of a vehicle (e.g., see vehicles 102 and 202), which can include or be a part of the computing system of the vehicle, can include at least one of engine electronics, transmission electronics, chassis electronics, passenger environment and comfort electronics, in-vehicle entertainment electronics, in-vehicle safety electronics, or navigation system electronics, or any combination thereof (e.g., see body control modules 110 and 220, powertrain control modules 112 and 222, power steering control unit 224, battery management system 226, and infotainment electronics 228 shown in FIGS. 1 and 2 respectively). In some embodiments, the electronic circuitry of the vehicle can include electronics for an automated driving system.

As mentioned, the computing system in some embodiments can be configured to perform one or more actions of the vehicle or control one or more actions of the vehicle (such as unlock a door of the vehicle, or activate at least part of the powertrain of the vehicle, or any combination thereof), upon confirmation of the identity of the user. Such control can include control of at least one electronic of the vehicle electronics of the vehicle, which can include control of configuration and preference information used by electronics and control modules of the vehicle. The configuration and preference information can pertain to adjustments of the vehicle via automotive electronics (such as adjustments in the transmission, engine, chassis, passenger environment, safety features, etc. via respective automotive electronics). The configuration and preference information can also pertain to automated driving configurations and preferences. The configuration and preference information can pertain to the various levels of automation according to the SAE. Such information can pertain to no automation preferences or configurations (level 0), driver assistance preferences or configurations (level 1), partial automation preferences or configurations (level 2), conditional automation preferences or configurations (level 3), high automation preferences or configurations (level 4), or full preferences or configurations (level 5). Preference information can include driving mode preferences such as sports or performance mode, fuel economy mode, tow mode, all-electric mode, hybrid mode, AWD mode, FWD mode, RWD mode, 4WD mode, etc. The modes can be specific or general. For example, a user can prefer specific sports mode of a specific automaker. Or, for example, a user prefers fuel economy modes over performance modes or sports modes. On the other hand, configuration information can include specific transmission configurations, engine configurations, chassis configurations, for the user for one or more vehicles. The configuration information can be based on the preference information. And the configuration information can adjust parts of the vehicle via respective electronics for the parts. The configuration and preference information can also pertain to in-car entertainment systems, automotive navigation systems, passenger comfort systems, electronic integrated cockpit systems, etc.

In some embodiments, the computing system of the vehicle can include a central control module (CCM), central timing module (CTM), and/or general electronic module (GEM).

Also, in some embodiments, the vehicle can include an ECU, which can be any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), or the like. Door control unit (DCU). Types of ECU can also include power steering control unit (PSCU), one or more human-machine interface (HMI) units, powertrain control module (PCM)—which can function as at least the ECM and TCM, seat control unit, speed control unit, telematic control unit, transmission control unit, brake control module, and battery management system.

As shown in FIG. 2, the networked system 100 can include at least a vehicle 202 that includes at least a vehicle computing system 204, a body (not depicted) having an interior (not depicted), a powertrain (not depicted), a climate control system (not depicted), and an infotainment system (not depicted). The vehicle 202 can include other vehicle parts as well.

The computing system 204, which can have similar structure and/or functionality as the computing system 104, can be connected to communications network(s) 115 that can include at least a local to device network such as Bluetooth or the like, a wide area network (WAN), a local area network (LAN), an intranet, a mobile wireless network such as 4G or 5G, an extranet, the Internet, and/or any combination thereof. The computing system 204 can be a machine capable of executing a set of instructions (sequential or otherwise) that specify actions to be taken by that machine. Also, while a single machine is illustrated for the computing system 204, the term "machine" shall also be taken to include any collection of machines that individually or jointly execute a set (or multiple sets) of instructions to perform a methodology or operation. And, it can include at least a bus (e.g., see bus 206) and/or motherboard, one or more controllers (such as one or more CPUs, e.g., see controller 208), a main memory (e.g., see memory 210) that can include temporary data storage, at least one type of network interface (e.g., see network interface 212), a storage system (e.g., see data storage system 214) that can include permanent data storage, and/or any combination thereof. In some multi-device embodiments, one device can complete some parts of the methods described herein, then send the result of completion over a network to another device such that another device can continue with other steps of the methods described herein.

FIG. 2 also illustrates example parts of the computing system 204. The computing system 204 can be communicatively coupled to the network(s) 115 as shown. The computing system 204 includes at least a bus 206, a controller 208 (such as a CPU), memory 210, a network interface 212, a data storage system 214, and other components 216 (which can be any type of components found in mobile or computing devices such as GPS components, I/O components such various types of user interface components, and sensors as well as a camera). The other components 216 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The computing system 204 can also include sensor interfaces that are configured to interface sensors of the vehicle 202 (e.g., see sensors 232a, 232b, and 232c). The bus 206 communicatively couples the controller 208, the memory 210, the network interface 212, the data storage system 214, the other components 216, and the sensors as well as sensor interfaces in some embodiments. The computing system 204 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 214, which communicate with each other via bus 206 (which can include multiple buses).

In some embodiments, the computer system 204 can include a set of instructions, for causing a machine to perform any one or more of the methodologies discussed herein, when executed. In such embodiments, the machine can be connected (e.g., networked via network interface 212) to other machines in a LAN, an intranet, an extranet, and/or the Internet (e.g., network(s) 115). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communications network (such as network(s) 115).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the system 204. The memory 210 can have execution capabilities such as it can at least partly execute instructions residing in the memory.

The vehicle 202 can also have vehicle body control module 220 of the body, powertrain control module 222 of the powertrain, a power steering control unit 224, a battery management system 226, infotainment electronics 228 of the infotainment system, and a bus 218 that connects at least the vehicle computing system 204, the vehicle body control module, the powertrain control module, the power steering control unit, the battery management system, and the infotainment electronics. Also, as shown, the vehicle 202 is connected to the network(s) 115 via the vehicle computing system 204. Also, shown, vehicle 130 and mobile devices 140 and 150 are connected to the network(s) 115. And, thus, are communicatively coupled to the vehicle 202.

The vehicle 202 is also shown having the plurality of sensors (e.g., see sensors 232a, 232b, and 232c), which can be part of the computing system 204. In some embodiments, the bus 218 can connect the plurality of sensors, the vehicle computing system 204, the vehicle body control module, the powertrain control module, the power steering control unit, the battery management system, and the infotainment electronics to at least the computing system 204. The plurality of sensors can be connected to the computing system 204 via sensor interfaces of the computing system. The bus 218 can include a controller area network bus (CAN bus), or a media oriented systems transport bus (MOST bus), or other forms of communications infrastructure in a vehicle that allow devices such as microcontrollers to communicate with each other in the vehicle, such as Ethernet. In some embodiments, the bus 218 can include gateways where in vehicle device interaction is abstracted with application programming interfaces (APIs) such as for security and safety. In some embodiments, other buses can be used such as, for example, CAN FD, HDBaseT, or EAVB.

In some embodiments, the computing system 204 can include, be, or be a part of an electronic device configured for installation into a vehicle that includes one or more interfaces for sensors. For example, the electronic device can include a first interface configured to receive first biometric data from a sensor attached to the vehicle. The electronic device can also include a second interface configured to receive second biometric data from a mobile device (e.g., see network interface 212 and mobile devices 140 and 150 shown in FIG. 2) and/or non-biometric data from the mobile device, when the mobile device is within a predetermined threshold distance from the sensor attached the vehicle.

In such examples and other examples, the electronic device can include a data processing part configured to associate the first biometric data and the second biometric data and/or non-biometric data with a user. The data processing part can also be configured to confirm an identity of the user according to at least the first biometric data and the second biometric data and/or the non-biometric data. The data processing part can also be configured to generate a first confidence score based on a comparison of a known first biometric feature of the user and a biometric feature in the first biometric data received from the sensor attached to the vehicle. And, the data processing part can also be configured to generate a second confidence score based on a comparison of a known second biometric feature of the user and a biometric feature in the second biometric data received from the mobile device. Also, the data processing part can also be configured to generate a second confidence score based on a comparison of a known non-biometric feature of the user or the user's mobile device and a non-biometric feature in the non-biometric data received from the mobile device. And, the data processing part can also be configured to generate a combined confidence score based on at least the generated confidence scores, as well as confirm an identity of the user when the generated combined confidence score exceeds a confidence threshold. The electronic device can also include a control interface configured to, upon confirmation of the identity of the user, perform an action for the vehicle or control an action for the vehicle (such as unlock a door of the vehicle, or activate at least part of the powertrain, or any combination thereof).

In such examples and other examples, the data processing part of the electronic device can be configured to generate at least one of the confidence scores using at least one ANN, wherein input of the at least one ANN can include at least the received biometric data or a derivative thereof. And, the data processing part of the electronic device can be configured to train the at least one ANN over time to increase effectiveness and/or efficiency of the at least one ANN for the user.

Also, the data processing part can be configured to: generate the first confidence score using an ANN (wherein input of the ANN includes the received first biometric data or a derivative thereof), and train the ANN over time to increase effectiveness of the ANN for the user over time. The data processing part can also be configured to: generate the second confidence score using a second ANN (wherein input of the second ANN includes the received second biometric data or a derivative thereof and/or the received non-biometric data or a derivative thereof), and train the second ANN over time to increase effectiveness and/or efficiency of the second ANN for the user over time.

The data processing part can also be configured to: generate the combined confidence score using a third ANN (wherein input of the third ANN includes at least one of the first received biometric data or a derivative thereof, the second received biometric data or a derivative thereof, the received non-biometric data or a derivative thereof, output of the ANN or a derivative thereof, or output of the second ANN or a derivative thereof, or any combination thereof), and train the third ANN over time to increase effectiveness and/or efficiency of the third ANN for the user over time.

As shown, the vehicle 202 also includes vehicle electronics, including at least electronics for the body and the powertrain of the vehicle as well as for other components of the vehicle. It can be inferred from FIG. 2 that the vehicle 202 includes at least the body, the body's interior (which can have seats and other interior furnishings), the powertrain, the climate control system, the infotainment system since corresponding electronics are shown as being a part of the vehicle 202. The body of the vehicle 202 includes at least a frame to support the powertrain as well as body electrical systems. A chassis of the vehicle 202 can be attached to the frame of the vehicle. The interior can provide seating for at least one driver or passenger. In other words, the interior can include one or more seats. The body can also include one or more doors and/or one or more windows. The body can also include any other known parts of a vehicle body. Also, the powertrain can include any other known parts of a vehicle powertrain.

In some embodiments, the body of the vehicle 202 can include doors and windows and an interior of the body can include seating, a dashboard, or center console, or any combination thereof. The body and the interior can also include or the vehicle 202 can also include passenger and driver comfort systems having climate control systems, or seat adjustment systems, or any combination thereof. The body and the interior can also include or the vehicle 202 can also include information and entertainment systems (or an infotainment system which is a combination of information and entertainment systems). As shown, the vehicle electronics of vehicle 202 can include electronics for the interior, the passenger and driver comfort systems, and the information and entertainment systems. And, in such embodiments, the set of components of the vehicle can include components of the interior, the passenger and driver comfort systems, or the information and entertainment systems, or any combination thereof. And, since the computing system 204 can be similar to the computing system 104, it can also be configured to, upon confirmation of the identity of the user, perform an action for the vehicle or control an action for the vehicle (such as unlock a door of the vehicle, or activate at least part of the powertrain, or any combination thereof), which can include control of the aforesaid electronics and components of the vehicle.

As shown in FIG. 3, the networked system 100 can include at least a mobile device 302. The mobile device 302, which can have somewhat similar structure and/or functionality as the computing system 104 or 204, can be connected to communications network(s) 115. And, thus, be connected to vehicles 102, 202, and 130 as well as mobile devices 140 and 150.

The mobile device 302, depending on the embodiment, can be or include a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the mobile device 302 can be connected to communications network(s) 115 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the mobile devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. The computing systems of the vehicles described herein can be a machine capable of executing a set of instructions (sequential or otherwise) that specify actions to be taken by that machine.

Also, while a single machine is illustrated for the computing systems and mobile devices described herein, the term "machine" shall also be taken to include any collection of machines that individually or jointly execute a set (or multiple sets) of instructions to perform any one or more of the methodologies or operations discussed herein. And, each of the illustrated mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the mobile device 302, in accordance with some embodiments of the present disclosure. The mobile device 302 can be communicatively coupled to the network(s) 115 as shown. The mobile device 302 includes at least a bus 306, a controller 308 (such as a CPU), memory 310, a network interface 312, a data storage system 314, and other components 316 (which can be any type of components found in mobile or computing devices such as GPS components, I/O components such various types of user interface components, and sensors (such as sensors) as well as a camera). The other components 316 can include one or more user interfaces (e.g., GUIs, auditory user interfaces, tactile user interfaces, etc.), displays, different types of sensors, tactile (such as sensors), audio and/or visual input/output devices, additional application-specific memory, one or more additional controllers (e.g., GPU), or any combination thereof. The bus 306 communicatively couples the controller 308, the memory 310, the network interface 312, the data storage system 314 and the other components 316. The mobile device 302 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 3 is a block diagram of mobile device 302 that has a computer system in which embodiments of the present disclosure can operate. In some embodiments, the computer system can include a set of instructions, for causing a machine to perform some of the methodologies discussed herein, when executed. In such embodiments, the machine can be connected (e.g., networked via network interface 312) to other machines in a LAN, an intranet, an extranet, and/or the Internet (e.g., network(s) 115). The machine can operate in the capacity of a server or a client machine in client-server network environment, as a peer machine in a peer-to-peer (or distributed) network environment, or as a server or a client machine in a cloud computing infrastructure or environment.

Controller 308 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, a programmable logic such as an FPGA, a digital signal processor (DSP), network processor, or the like. Controller 308 is configured to execute instructions for performing the operations and steps discussed herein. Controller 308 can further include a network interface device such as network interface 312 to communicate over one or more communications network (such as network(s) 115).

The data storage system 314 can include a machine-readable storage medium (also known as a computer-readable medium) on which is stored one or more sets of instructions or software embodying any one or more of the methodologies or functions described herein. The data storage system 314 can have execution capabilities such as it can at least partly execute instructions residing in the data storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 302. The memory 310 can have execution capabilities such as it can at least partly execute instructions residing in the memory.

While the memory, controller, and data storage parts are shown in example embodiments to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As shown in FIG. 3, the mobile device 302 can include a user interface (e.g., see other components 316). The user interface can be configured to provide a graphical user interface (GUI), a tactile user interface, or an auditory user interface, or any combination thereof. For example, the user interface can be or include a display connected to at least one of a wearable structure, a computing device, or a camera or any combination thereof that can also be a part of the mobile device 302, and the display can be configured to provide a GUI. Also, embodiments described herein can include one or more user interfaces of any type, including tactile UI (touch), visual UI (sight), auditory UI (sound), olfactory UI (smell), equilibria UI (balance), and gustatory UI (taste).

Also, as shown in FIG. 3, the mobile device 302 can include a computing system (e.g., see the bus 306, controller 308, the memory 310, the network interface 312, and the data storage system 314, which are all components of the computing system). The computing system of the mobile device 302 can be configured to retrieve biometric and/or non-biometric user authentication data from its user, itself, and its sensors (e.g., see other components 316), and then send the biometric and/or non-biometric data to a vehicle connected to the mobile device via its network interface and network(s) 115.

Figure 4:
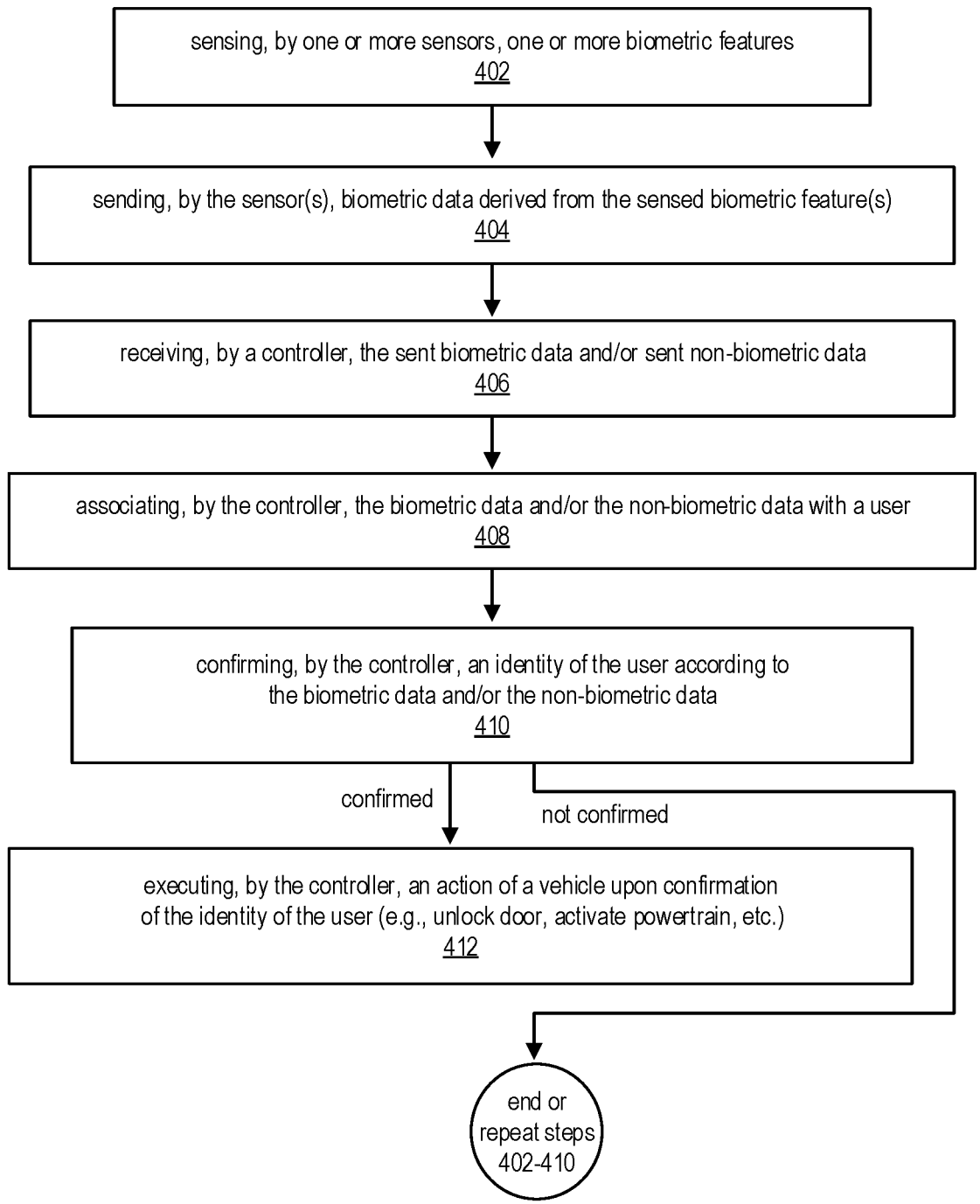
FIGS. 4 to 5 illustrate flow diagrams of example operations that can be performed by aspects of the networked system depicted in FIGS. 1 to 3, in accordance with some embodiments of the present disclosure.

FIG. 4 illustrates a flow diagram of example operations of method 400 that can be performed by aspects of the networked system depicted in FIGS. 1 to 3, in accordance with some embodiments of the present disclosure. For example, the method 400 can be performed by a computing system and/or other parts of any vehicle and/or mobile device depicted in FIGS. 1 to 3.

In FIG. 4, the method 400 begins at step 402 with sensing, by one or more sensors (such as one or more sensors of a vehicle and/or a mobile device), one or more biometric features (such as one or more biometric features of a user). At step 404, the method continues with sending, by the sensor(s), biometric data derived from the sensed biometric feature(s). At step 406, the method continues with receiving, by a controller (such as a controller including computer hardware and/or software and/or circuitry including a computing system and/or an ECU), the sent biometric data and/or sent non-biometric data. The sent data being data sent for authentication.

At step 408, the method 400 continues with associating, by the controller, the biometric data and/or the non-biometric data with a user. At step 410, the method 400 continues with confirming, by the controller, an identity of the user according to the biometric data and/or the non-biometric data. At step 412, the method 400 continues with executing, by the electronic circuitry, an action of a vehicle upon confirmation of the identity of the user (e.g., unlock door, activate powertrain, etc.). If at step 410, the identity of the user is not confirmed, then the method 400 either ends or repeats steps 402 to 410.

In some embodiments, it is to be understood that steps 402 to 412 can be implemented as a continuous process such as each step can run independently by monitoring input data, performing operations and outputting data to the subsequent step. Also, steps 402 to 412 can be implemented as discrete-event processes such as each step can be triggered on the events it is supposed to trigger and produce a certain output. It is to be also understood that FIG. 4 represents a minimal method within a possibly larger method of a computer system more complex than the ones presented partly in FIGS. 1 to 3. Thus, the steps depicted in FIG. 4 can be combined with other steps feeding in from and out to other steps associated with a larger method of a more complex system.

Figure 5:
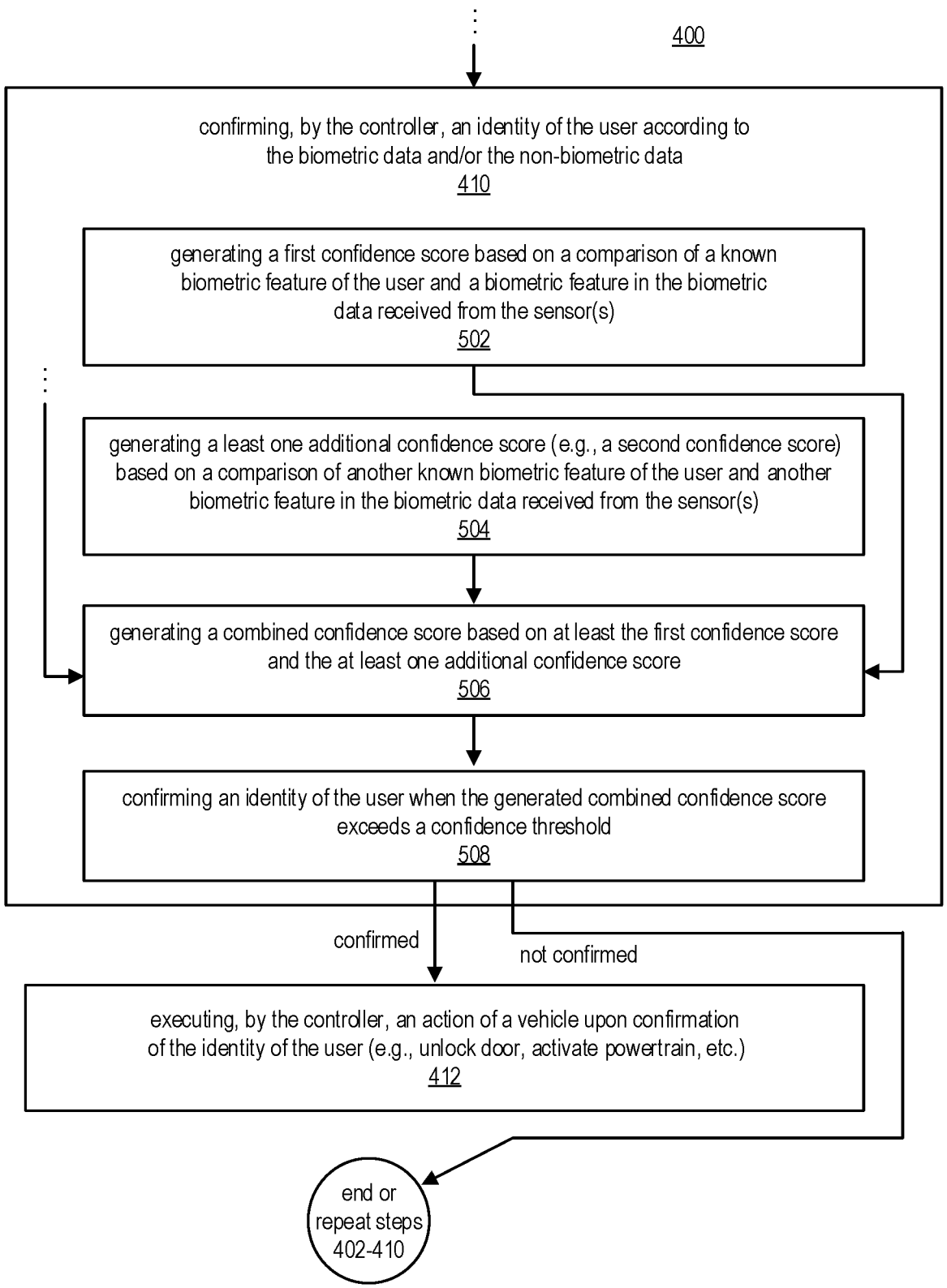

FIG. 5 illustrates a flow diagram of example operations of a method within step 410 of method 400, in accordance with some embodiments of the present disclosure (i.e., a method for confirming an identity of the user according to the biometric data and/or the non-biometric data). The method within step 410 of method 400 can be performed by aspects of the networked system depicted in FIGS. 1 to 3. For example, the method within step 410 can be performed by a computing system and/or other parts of any vehicle and/or mobile device depicted in FIGS. 1 to 3.

In FIG. 5, the method within step 410 begins at step 502 with generating a first confidence score based on a comparison of a known biometric feature of the user and a biometric feature in the biometric data received from the sensor(s). At step 504, the method within step 410 continues with generating a least one additional confidence score (e.g., a second confidence score) based on a comparison of another known biometric feature of the user and another biometric feature in the biometric data received from the sensor(s). Also, at step 504, the method within step 410 can continue with generating a least one additional confidence score (e.g., a second confidence score) based on a comparison of a known non-biometric feature of the user or the user's mobile device and a non-biometric feature in received non-biometric data—this alternative is not shown in FIG. 5. At step 506, the method within step 410 continues with generating a combined confidence score based on at least the first confidence score and the at least one additional confidence score. And, at step 508, the method within step 410 continues with confirming an identity of the user when the generated combined confidence score exceeds a confidence threshold. Then, as shown in FIG. 5, the method 400 continues with executing, by the electronic circuitry, an action of a vehicle upon confirmation of the identity of the user (e.g., unlock door, activate powertrain, etc.). If at step 410, the identity of the user is not confirmed, then the method 400 either ends or repeats steps 402 to 410.

In some embodiments, it is to be understood that steps 502 to 508 can be implemented as a continuous process such as each step can run independently by monitoring input data, performing operations and outputting data to the subsequent step. Also, steps 502 to 508 can be implemented as discrete-event processes such as each step can be triggered on the events it is supposed to trigger and produce a certain output. It is to be also understood that FIG. 5 represents a minimal method within a possibly larger method of a computer system more complex than the ones presented partly in FIGS. 1 to 3. Thus, the steps depicted in FIG. 5 can be combined with other steps feeding in from and out to other steps associated with a larger method of a more complex system.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   at least one processing device; and
   memory containing instructions configured to instruct the at least one processing device to:
   receive first data from a first sensor of a vehicle, wherein the first data comprises biometric data;
   receive second data from a second sensor of the vehicle, wherein the second data comprises non-biometric data;
   associate the first and second data with a user;
   generate a first confidence score based on a comparison of a known first feature of the user and a feature in the first data, wherein the first confidence score is generated using a first artificial neural network (ANN), and wherein an input of the first ANN comprises the received first data or a derivative thereof;
   generate a second confidence score based on a comparison of a known second feature of the user and a feature in the second data, wherein the second confidence score is generated using a second ANN, and wherein an input of the second ANN comprises the received second data or a derivative thereof;
   generate a combined confidence score based on at least the generated first and second confidence scores;
   confirm an identity of the user when the generated combined confidence score exceeds a confidence threshold; and
   in response to confirming the identity of the user, cause at least one action for the vehicle.

2. The system of claim 1, wherein the instructions are further configured to instruct the at least one processing device to:
   train the first ANN using the first data, wherein the biometric data comprises at least one of a fingerprint, a facial image, iris data, or voice data.

3. The system of claim 1, wherein the instructions are further configured to instruct the at least one processing device to:
   train the second ANN using the second data, wherein the second data is received from a mobile device.

4. The system of claim 1, wherein the instructions are further configured to instruct the at least one processing device to:
   generate the combined confidence score using a third ANN, wherein an input of the third ANN comprises at least one of the first received data or a derivative thereof, the second received data or a derivative thereof, an output of the first ANN or a derivative thereof, or an output of the second ANN or a derivative thereof; and
   train the third ANN using at least one of the first or second data.

5. The system of claim 1, wherein the first sensor comprises a fingerprint scanner.

6. The system of claim 5, wherein the first sensor comprises a microphone.

7. The system of claim 1, wherein the first sensor comprises a camera, and the first data is used for facial recognition.

8. The system of claim 7, wherein the camera is a thermal camera.

9. The system of claim 1, wherein the first sensor comprises a camera, and the first data is used for iris recognition.

10. A system comprising:
    at least one processing device; and
    memory containing instructions configured to instruct the at least one processing device to:
    receive non-biometric first data from a sensor attached to a vehicle;
    receive biometric second data from a mobile device;
    associate the first and second data with a user;
    generate a first confidence score based on a comparison of a known first feature of the user and a feature in the received first data;
    generate a second confidence score based on a comparison of a known second feature of the user and a feature in the received second data;
    generate a combined confidence score based on at least the generated first and second confidence scores;
    in response to determining that the generated combined confidence score exceeds a confidence threshold, confirm an identity of the user; and
    in response to confirming the identity of the user, cause at least one action for the vehicle comprising at least one of unlocking a door of the vehicle, or activating at least part of a powertrain of the vehicle.

11. The system of claim 10, wherein the instructions are further configured to instruct the at least one processing device to:
    generate at least one of the confidence scores using at least one artificial neural network (ANN), wherein an input of the at least one ANN comprises at least the received first data or a derivative thereof; and
    train the at least one ANN over time to increase effectiveness of the at least one ANN for the user.

12. The system of claim 10, wherein the instructions are further configured to instruct the at least one processing device to:
    generate the first confidence score using a first artificial neural network (ANN), wherein an input of the first ANN comprises the received first data or a derivative thereof; and
    train the first ANN to increase effectiveness of the first ANN for the user.

13. The system of claim 12, wherein the instructions are further configured to instruct the at least one processing device to:
    generate the second confidence score using a second ANN, wherein an input of the second ANN comprises the received second data or a derivative thereof; and
    train the second ANN to increase effectiveness of the second ANN for the user.

14. The system of claim 13, wherein the instructions are further configured to instruct the at least one processing device to:
    generate the combined confidence score using a third ANN, wherein an input of the third ANN comprises at least one of the first received data or a derivative thereof, the second received data or a derivative thereof, an output of the first ANN or a derivative thereof, or an output of the second ANN or a derivative thereof; and train the third ANN to increase effectiveness of the third ANN for the user.

15. The system of claim 10, wherein the second data comprises data from a microphone.

16. The system of claim 10, wherein the second data comprises at least one of audio data or voice data.

17. The system of claim 10, wherein the second data comprises at least one of image data, facial recognition data, or iris recognition data.

18. A method comprising:

receiving data from a sensor of a vehicle;

receiving data from a mobile device;

generating a confidence score based on a comparison of a known feature of a user and a feature in the data received from the sensor, and a comparison of a known credential of the user and the data received from the mobile device, wherein the confidence score is generated using at least one artificial neural network (ANN), and wherein an input of the at least one ANN comprises the data received from the sensor or a derivative thereof, and the data received from the mobile device or a derivative thereof;

identifying the user when the generated confidence score exceeds a confidence threshold; and in response to identifying the user, causing at least one action for the vehicle.

* * * * *